United States Patent (10) Patent No.: US 8,085,937 B1
Bradley, II (45) Date of Patent: Dec. 27, 2011

(54) SYSTEM AND METHOD FOR SECURING CALLS BETWEEN ENDPOINTS (75) Inventor: Charles B. Bradley, II, Largo, FL (US)

(73) Assignee: Raytheon Company, Waltham, MA (US)

( * ) Notice: Subject to any disclaimer, the term of this patent is extended or adjusted under 35 U.S.C. 154(b) by 1383 days.

(21) Appl. No.: 11/058,049

(22) Filed: Feb. 14, 2005

(51) Int. Cl.
 *H04L 9/08* (2006.01)
(52) U.S. Cl. ......... 380/282; 380/259; 380/281; 713/168
(58) Field of Classification Search .................. None
 See application file for complete search history.

(56) References Cited

U.S. PATENT DOCUMENTS

| 5,537,475 | A  | * | 7/1996  | Micali ............................ 380/30 |
| 5,557,678 | A  | * | 9/1996  | Ganesan ........................ 380/282 |
| 5,590,199 | A  | * | 12/1996 | Krajewski et al. ............ 713/159 |
| 7,099,620 | B2 | * | 8/2006  | Miller ............................ 434/350 |
| 2003/0031165 | A1 | * | 2/2003 | O'Brien, Jr. .................. 370/352 |
| 2003/0046539 | A1 | * | 3/2003 | Negawa ........................ 713/163 |

OTHER PUBLICATIONS

Bishop, Matt, Computer Security; 2003; Addison-Wesley; Chapter 12.*

* cited by examiner

*Primary Examiner* — Kaveh Abrishamkar
(74) *Attorney, Agent, or Firm* — Baker Botts L.L.P.

(57) ABSTRACT

According to one embodiment of the present invention, a method of establishing a secure call includes generating a session key at a centralized location. The session key is encrypted with a first public key and transmitted from the centralized location to a first endpoint. The session key is additionally encrypted with a second public key and transmitted from the centralized location to a second endpoint. The centralized location is at a location other than a location of the first endpoint and the second endpoint. The session key is operable to encrypt the call between the first endpoint and the second endpoint.

12 Claims, 5 Drawing Sheets

SYSTEM AND METHOD FOR SECURING CALLS BETWEEN ENDPOINTS

TECHNICAL FIELD OF THE INVENTION

This invention relates in general to the field of communications and, more particularly, to a system and method for securing calls between endpoints.

BACKGROUND OF THE INVENTION

The digitization of media content has vastly facilitated the ability to communicate media content from endpoint to another. One example is voice over internet protocol (VOIP) communications, which generally allows digital voice communications to be transmitted over a digital network infrastructure. With the growth of such digital communications, so grows concerns as to how to secure such communications. For example, a general concern may be how to ascertain who is on the other end of the communication line. Yet other concerns involve attacks that may occur in such communications including, among others, remote access manipulation, sniffing, selective denial of service (DoS), data exfiltration, brute-force DoS, signaling attacks, IP spoofing, man-in-the middle attacks, PIN intercept/guessing, and Spam over Internet Telephony.

SUMMARY OF THE INVENTION

According to one embodiment of the present invention, a method of establishing a secure call includes generating a session key at a centralized location. The session key is encrypted with a first public key and transmitted from the centralized location to a first endpoint. The session key is additionally encrypted with a second public key and transmitted from the centralized location to a second endpoint. The centralized location is at a location other than a location of the first endpoint and the second endpoint. The session key is operable to encrypt the call between the first endpoint and the second endpoint.

Certain embodiments may provide a number of technical advantages. For example, a technical advantage of one embodiment may include the capability to generate a single session key and communicate the session key to a plurality of endpoints by encrypting the session key with each endpoint's public key. Other technical advantages of other embodiments may include the capability to authenticate a user with an endpoint on multiple levels.

Although specific advantages have been enumerated above, various embodiments may include all, some, or none of the enumerated advantages. Additionally, other technical advantages may become readily apparent to one of ordinary skill in the art after review of the following figures, description, and claims.

BRIEF DESCRIPTION OF THE DRAWINGS

To provide a more complete understanding of the present invention and features and advantages thereof, reference is made to the following description, taken in conjunction with the accompanying figures, wherein like reference numerals represent like parts, in which.

DETAILED DESCRIPTION OF EXAMPLE EMBODIMENTS

It should be understood at the outset that although example implementations of embodiments of the invention are illustrated below, the present invention may be implemented using any number of techniques, whether currently known or in existence. The present invention should in no way be limited to the example implementations, drawings, and techniques illustrated below. Additionally, the drawings are not necessarily drawn to scale.

Figures 1, 2, 3:
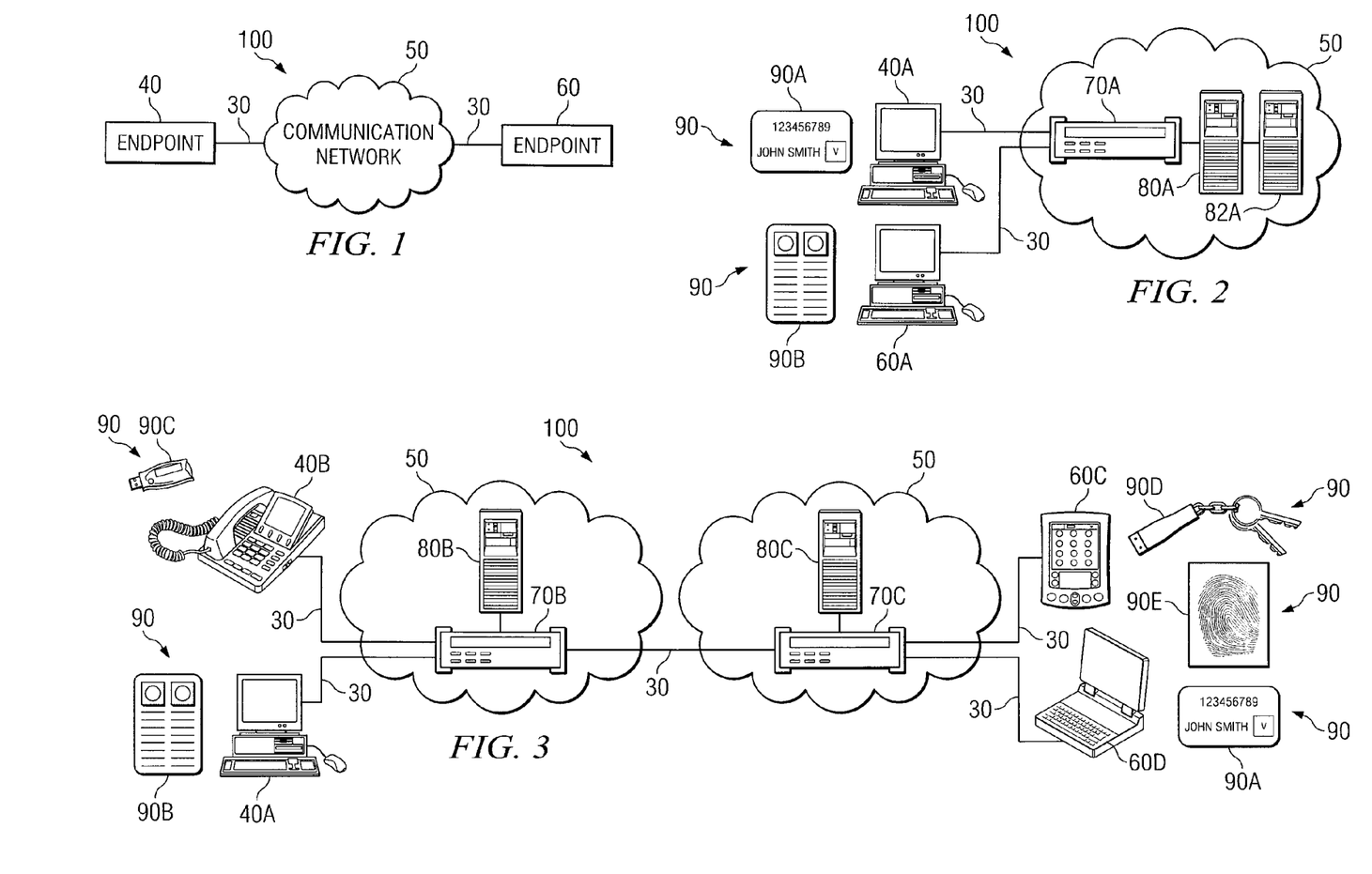
FIG. 1 is a simplified block diagram illustrative of a communication system that may be utilized to facilitate communication between a first endpoint and an second endpoint through a communication network.
FIGS. 2 and 3 are embodiments of architectures of communication systems that may be utilized in embodiments of the invention.

FIG. 1 is a simplified block diagram illustrative of a communication system 100 that may be utilized to facilitate communication between an endpoint 40 and an endpoint 60 through a communication network 50. As used herein, "endpoint" may generally refer to any object, device, software, or any combination of the preceding that is generally operable to communicate with another endpoint. As an example, an endpoint may represent a user, which in turn may refer to a user profile representing a person. The user profile may comprise, for example, an address for the user, a user passcode, a user name, other user information, or any combination of the preceding.

As another example, an endpoint may represent a device that comprises any hardware, software, firmware, or combination thereof operable to communicate through the communication network 50. Examples of an endpoint include, but are not necessarily limited to, a computer, a switch, a personal digital assistant, a cellular telephone, or any other device or component of such device suitable for communicating information to and from the communication network 50. Endpoints may support Internet Protocol (IP) or other suitable communication protocols. Endpoints may additionally include a medium access control (MAC) and a physical layer (PHY) interface that conforms to IEEE 801.11. A device may have a device identifier such as the MAC address and may have a device profile that describes the device.

The communication network 50 may comprise all or a portion of a public switched telephone network (PSTN); a public or private data network; a local area network (LAN); a metropolitan area network (MAN); a wide area network (WAN); a wireline or wireless network; a local, regional, or global communication network; an optical network; a satellite network; an enterprise intranet; other suitable communication links; or any combination of the preceding. Similarly, the communication links 30 between the endpoints 40, 60 may include all or a portion of a public switched telephone network (PSTN); a public or private data network; a local area network (LAN); a metropolitan area network (MAN); a wide area network (WAN); a wireline or wireless network; a local, regional, or global communication network; an optical network; a satellite network; an enterprise intranet; other suitable communication links; or any combination of the preceding.

Public key encryption (PKE) is an asymmetric form of encryption that utilizes two keys for each endpoint, a public key and a private key. The private key is kept private by the endpoint, while the complementary public key is made publicly available. Information encrypted with a public key can be unencrypted with a private key, and information encrypted with a private key can be unencrypted with a public key. The public key infrastructure (PKI) uses public key encryption to provide authentication of endpoints.

Information may be encrypted with a first endpoint's private key and transmitted to a second endpoint. The second endpoint uses the first endpoint's complementary public key to decrypt the encrypted information thereby authenticating the first endpoint. The second endpoint can also encrypt information with the second entity's private key, and the first endpoint can decrypt the encrypted information with second entity's public key in order to authenticate the second endpoint.

Digital certificates may be utilized to certify credentials associated with a public key. The term "digital certificate" may refer to a piece of data or information that has been "digitally signed"—signed by, for example, a certificate authority. Prior to issuing a digital certificate, a certificate authority typically (1) verifies an identity of an endpoint, and (2) verifies that the endpoint is in possession of a particular private key. A digital certificate typically includes the public key of the verified endpoint. Other information about the endpoint may also be included. The information is encrypted (e.g., "digitally signed") with the certificate authority's private key. The signed digital certificate (1) serves as proof of possession of a private key, and (2) operates to bind certain information (for example, identity) to a particular endpoint.

Authenticated communication may generally be established between endpoint 40 and endpoint 60 utilizing public key encryption and digital certificates. For example, endpoint 40 may encrypt or "digitally sign" information with a private key and transport the encrypted information along with a digital certificate of endpoint 40 to endpoint 60. Endpoint 60 may then first authenticate the digital certificate of endpoint 40 with a certificate authority's private key, extracting a public key of endpoint 40 from the digital certificate. Endpoint 60 then may utilize the extracted public key of endpoint 60 to decrypt or authenticate the information sent by endpoint 40, the public key of endpoint 40 being complementary to the private key of public 40 that digitally signed the information. Endpoint 60 can reciprocally transport information back to endpoint 40 using a private key of the endpoint 60.

The term "digital signature", along with any variations thereof, may refer to any piece of data or information that can be authenticated with another piece of data or information. Encryption of information and the associated decryption of the information are but one process of authenticating information. While examples of a digital signature will be given herein with reference to a piece of information being digitally signed with a private key and then being authenticated with a public key, it should be expressly understood that a variety of other technologies, techniques, and processes may be utilized, including not only those that are now known, but also those that will be later developed. Examples include any suitable challenge-response systems and techniques. Embodiments of the invention, herein, are not intended as being limited to any one digital signature, authentication scheme, or both. Accordingly, references to private keys and public keys are intended as only being illustrative of one technique that can be utilized.

FIGS. 2 and 3 are embodiments of architectures of communication systems 100 that may be utilized in embodiments of the invention. FIG. 1 generally illustrates communication between two endpoints 40A, 60A through a gatekeeper 70A. The gatekeeper 70A is in communication with servers 80A and 82A. A configuration such as this may generally be representative of communications under a single domain—e.g., the servers 80A, 82A serving one domain. FIG. 3 generally illustrates a variety of endpoints 40A, 40B, 60C, and 60D, communicating through a system 100 with two gatekeepers 70B, 70C. Each gatekeeper 70B, 70C is generally shown in communication with a server 80B, 80C. A configurations such as this may generally be representative of communications occurring across two domains—e.g., server 80B, corresponding to one domain and server 80C corresponding to another domain. Although a basic general architectural configuration of system 100 has been shown in FIGS. 1, 2, and 3, the communication systems 100 may be varied significantly, or alternatively substituted with any suitable networking components or elements that operate to provide a communicative platform. Further, although specific networking components are shown in the embodiment of FIGS. 2 and 3, other embodiments may only utilize some or none of the networking components shown herein. For example, while not explicitly shown, in some embodiments, the system may include a time division multiplexing (TDM) domain in communication with the gateways 70A, 70B, or 70C—e.g., via communication through a H.323-ISDN Gateway.

Gatekeepers 70A, 70B, and 70C may generally include any suitable gatekeeper, including in some embodiments, H.323/235 standard gatekeepers. Other embodiments may include yet other types of gatekeepers.

In FIGS. 2 and 3, a variety of different types of endpoints 40A, 60A, 40B, 60C, and 60D, are shown including personal computers, PDA, phones and laptops. A variety of other types of endpoints may additionally be utilized in other embodiments of the invention. Endpoints such as these and others may digitally communicate with one another through the communication network 50 using various protocols, for example internet protocol (IP). Other protocols may additionally be utilized in embodiments of the invention, including those that will later be developed. Among other types of digital communication, the devices may communicate utilizing video, images, voice, and other data.

In such communication between endpoints, a variety of different authentication schemes may be utilized to authenticate a user with an endpoint. Such an authentication may generally associates an actual user with an endpoint as opposed to simply having an identification of an endpoint. As an example, in typical public switched telephone networks (PSTN), caller ID tags may tag a call phone call coming from a particular phone. However, these caller ID tags do not tag the actual user who is making the call. Accordingly, any of a plurality of users may be using the actual phone making the call. Such authentication schemes may include a variety of different authentication devices 90 including, but not limited to, smart cards 90A, 90B; USB tokens 90C, 90D; biometric devices 90E; passwords/pins entry systems; retinal scans system; DNA scan systems; voice recognition systems; or combinations of the preceding. Higher levels of security may be obtained through utilization of combinations of different devices. For example, authentication may be based upon (1) something a user has possession of (e.g., smart cards 90A, 90B; USB tokens 90C, 90D), (2) something a user knows (e.g., pin/password), and (3) some biological feature linked with a specific user (e.g., fingerprints, voice, retinal characteristics, or even DNA).

Other concerns involve that may be maintained in communications between endpoints involve attacks that may occur in such communications including, among others, remote access manipulation, sniffing, selective denial of service (DoS), data exfiltration, brute-force DoS, signaling attacks, IP spoofing, man-in-the middle attacks, PIN intercept/guessing, and Spam over Internet Telephony. In light of these concerns and others, teachings of the invention recognize that it may generally be desirable to enable a secure transmission of messages in which (1) a message sender can be authenticated, (2) the message will remain unchanged, and (3) the message will remain confidential against unwanted user or disclosure.

Figure 4:
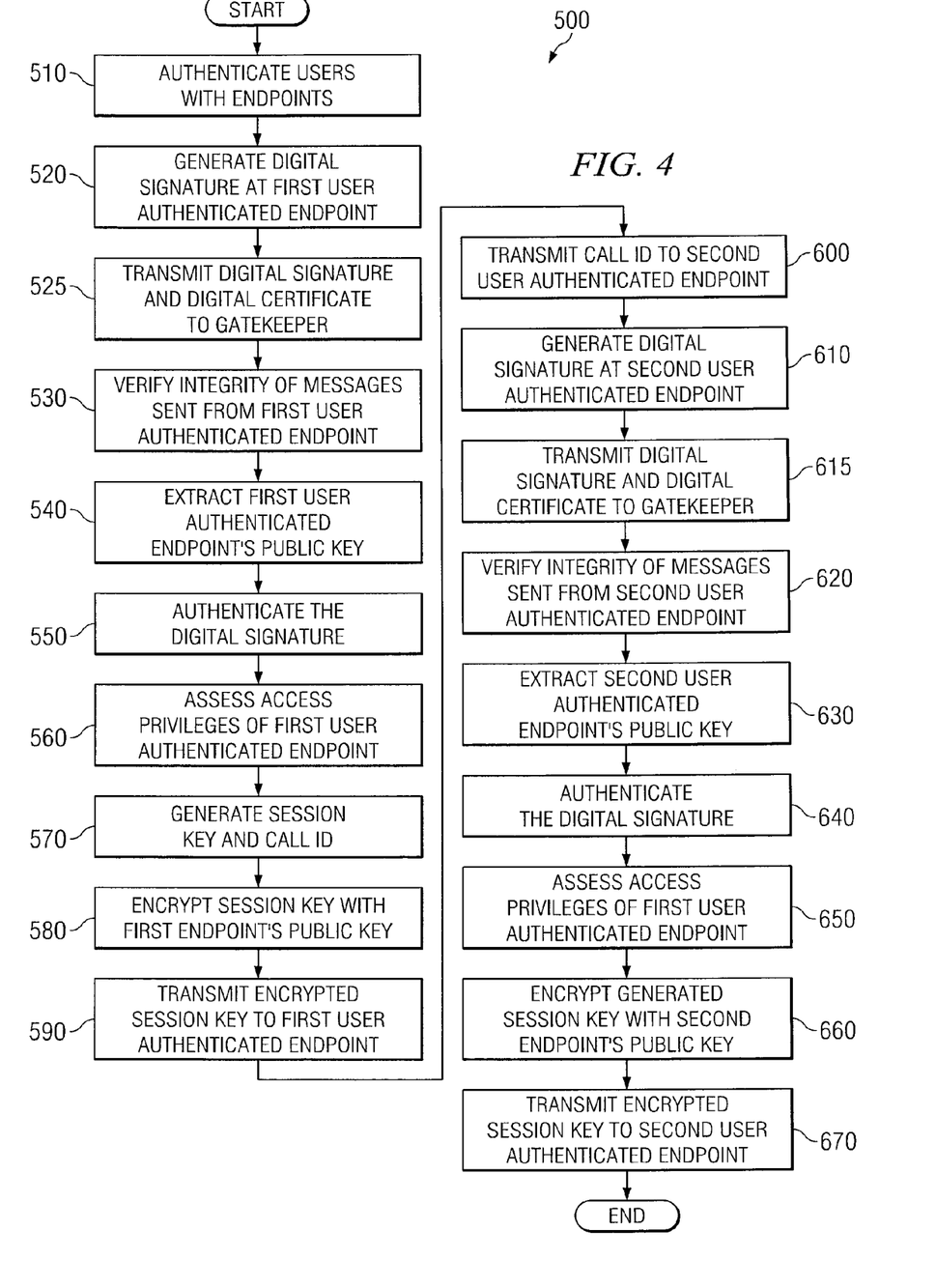
FIG. 4 is a process flow diagram of an embodiment that may be utilized to establish communication between a first endpoint and a second endpoint.
Figure 5:
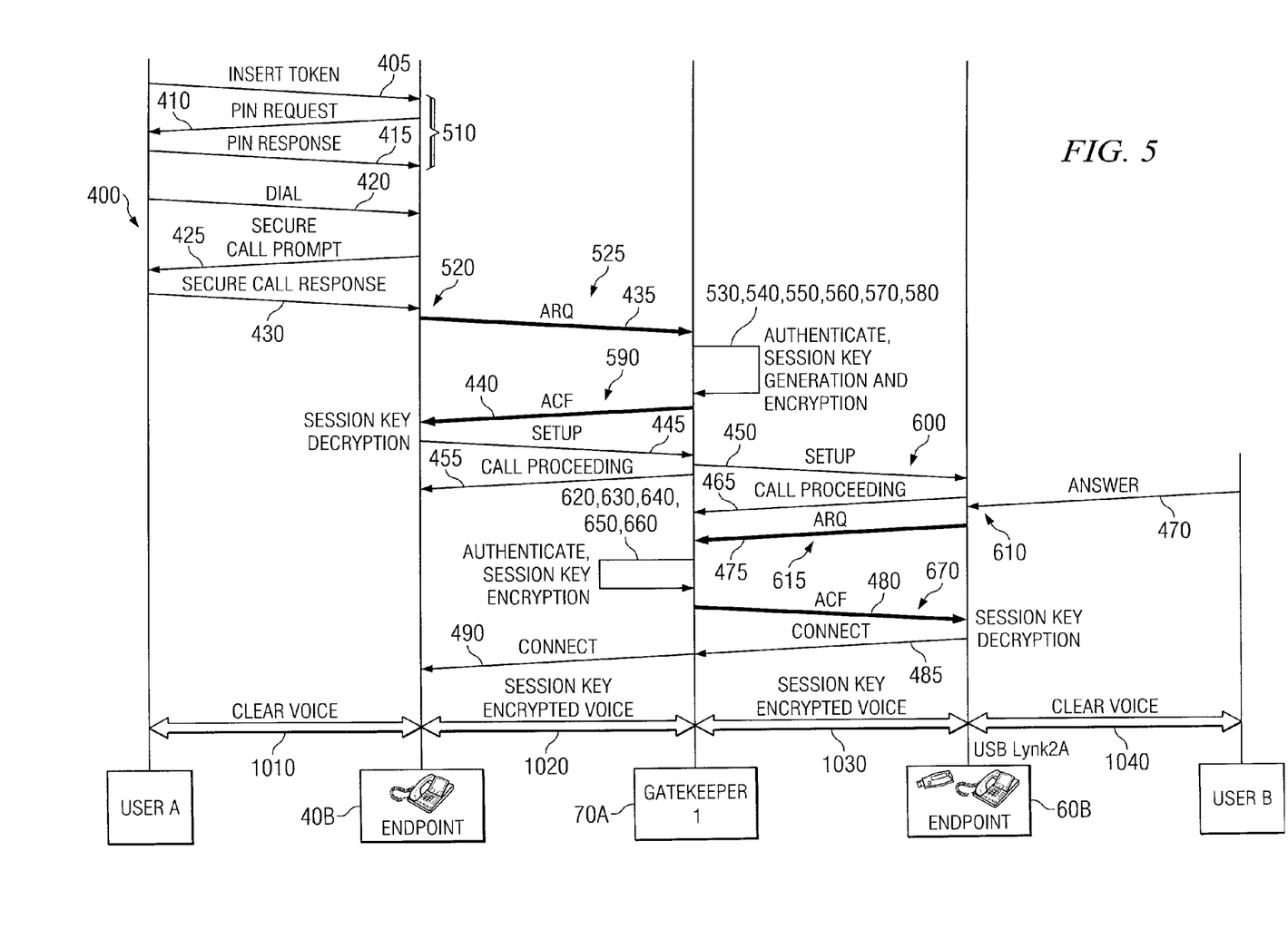
FIG. 5 is a call flow diagram of an embodiment that may be utilized to establish communication between a first endpoint and a second endpoint.

FIG. 4 is a process flow diagram of an embodiment that may be utilized to establish communication between a first endpoint and second endpoint. FIG. 5 is a call flow diagram of an embodiment that may be utilized to establish communication between a first endpoint and second endpoint. With reference to FIGS. 2, 4 and 5, the following is an example illustration of an establishment of communications between an endpoint 40B and an endpoint 60B utilizing a process 500 and a call flow 400.

The overall process 500 may generally commence with authentication of users at process 510. For example, User A may be authenticated with endpoint 40B and User B may be authenticated with endpoint 60B. In such an authentication process 510, any of a variety of authentication schemes may be utilized, including authentication devices 90 such as, but not limited to, smart cards 90A, 90B; USB tokens 90C, 90D; biometric devices 90E, passwords/pins entry systems, retinal scans system, DNA scan systems, voice recognition systems, or combinations of the preceding. In FIG. 5 and with respect to User A, the authentication process 510 includes inserting a token (e.g., a USB token 90C) in the endpoint 40B at flow 405. The endpoint 40B upon recognition of insertion of the USB token 90C may respond with a PIN request at flow 410. User A may then enter the PIN in to the endpoint at flow 415. A similar or different authentication process 510 may occur between User B and endpoint 60B, utilizing any suitable authentication scheme. For purposes of brevity, the authentication is not explicitly shown with respect to User B.

After authentication occurs between Users A, B and endpoints 40B, 60B, the endpoints 40B, 60B may make a determination as to whether or not session keys can be supported with the current authentication scheme. For example, in some embodiments, session key support may be obtained from the authentication device 90—in other words, session key functionality may reside with the authentication device 90. Accordingly, the endpoints 40B, 60B may determine whether such authentication devices 90 (e.g., USB tokens 90C, 90D or smarts cards 90A, 90B) support session keys. In other embodiments, session key support may be obtained from endpoints 40B, 60B that are properly authenticated—in other words, session key functionality may resides with the endpoints 40B, 60B. If session key functionality is supported, the endpoint 40B may query the User A as to whether or not a secure call would like to be attempted at flow 425. Such a query may be sent either prior to or after a number is dialed at flow 425. User A may send an affirmative or negative answer to the endpoints secure call query at flow 430.

The endpoint 40B, upon receiving an affirmative answer from User A in flow 430 may engage in a process 520 of creating a digital signature to transmit in a admission request (ARQ) message to the gatekeeper 70A. The ARQ message may generally conform to any suitable standard to be utilized in the system 100. One example standards is RAS H.225. Among other items, the process 520 of creating the digital signature may include populating a clear token. The clear token, among other features, may be utilized to identify the User A, the endpoint 40B, and/or both to other users—for example, identifying User A to User B and vice versa. The clear token may include, but is not limited to a date stamp, a timestamp, a random number to prevent playback, User A's digital certificate (which includes User A's public key), and the sender's ID field. Upon populating the clear token, the digital signature may be created (e.g., digitally signed) using User A's private key. In some embodiments User A's private key, digital certificate, and other pertinent data may be located on authentication device 90 (e.g., smart cards 90A, 90B; USB tokens 90C, 90D)—e.g., allowing User A to utilize any suitable endpoint. In other embodiments, User A's private key, digital certificate, and other pertinent data may be located on an endpoint, accessible only upon proper authentication. In yet further embodiments, a portion of each respective private key, digital certificate, and other pertinent data may be on an authentication device and another portion may be on an endpoint—e.g., allowing a user to only use a trusted endpoint. Preferably, the private key, digital certificate, and other pertinent data may only be accessible upon proper authentication.

After the digital signature is created, and prior to transmittal of the ARQ message, any of a variety of hashing schemes may be utilized to facilitate integrity in the transmittal of message. For example, the digital signature may be ran through a hashing algorithm such as SHA1. Yet other hashing algorithms and hashing techniques may be utilized—for example, utilizing bogus hash values and replacement techniques associated with such bogus hash values.

The digital certificate and digital signature are transmitted via an ARQ message to the gatekeeper 70A at process 525 or flow 435. Upon receipt of the ARQ message (including the digital signature and digital certificate), the gatekeeper 70A may verify the integrity of the ARQ message at process 530 by, among other techniques, checking the hash value. Such an integrity check, among other features, may verify that the message was not manipulated during transmission. The details of a particular integrity, check may depend on the particular hashing algorithms and hashing techniques utilized prior to transmittal. If integrity does not check out, the process 500 may generate an error message that is transmitted back to the endpoint. If the integrity of the message checks out, the process 500 may proceed to a process 540 of extracting the public key contained within the digital certificate.

Prior to the process 540 of extracting the public key from the digital certificate, the gatekeeper 70A may first analyze the digital certificate sent by the endpoint 40B to determine whether or not the digital certificate can be trusted. As briefly referenced above, the digital certificate may in some embodiments be issued by a trusted certificate authority—that is, digitally signed with a private key of a certificate authority. Therefore, as an example of determining whether or not the certificate can be trusted, the gatekeeper 70A may use a public key of the trusted certificate authority to authenticate the digital certificate. Yet other methods and techniques of establishing whether a digital certificate can be trusted may be utilized. After the digital certificate is authenticated and/or established as being trustworthy, the gatekeeper 70A may engage in the process 540 of extracting the public key from the digital certificate. In some embodiments, the public key may be extracted from the digital certificate by using a public key of the certificate authority that digitally signed the digital certificate. Other methods may be utilized in other embodiments.

The public key may be utilized in a process 550 of authenticating the digital signature. As an example, intended for illustrative purposes, the public key and digital signature may be forwarded to a encryption application program interface (API) engine, which utilizes the public key to authenticate or decrypt the digital signature. If authentication fails, a message may be sent back to the endpoint at process 555, indicating that authentication was unsuccessful. If authentication passes, the process 500 may proceed to a process 560 of assessing access privileges.

The process 560 of assessing access privileges may generally be utilized to establish the extent of a user's communication. As an example, multiple security levels may be established within an organization, each user being assigned a particular security level. Each security level may have access to a particular resource and/or other users. For example, a conference call may be established, and based upon security clearances, only users having "top secret" security clearance may be allowed to participate in the call. As another example, a particular user may only be able to accept calls from another user have a minimum level of security. Yet other privileges may be applied in a variety of other manners—either within an organization or external to the organization. An implementation of such a privilege feature may be accomplished in a variety of manners. For example, call request messages may be routed through an access proxy on server 80A or 82A. The access proxy may have the ability to review the message request and determine whether or not privileges associated with a particular user, permit the request. In some embodiments, the privileges may be placed on a database, accessible by the proxy server, while in other embodiments, the privileges may be associated with the message itself, for example, as transmitted in credentials transmitted from the user (e.g., from a token that was authenticated).

If the specific message request is allowed, the gatekeeper 70A in a process 570 may generate a session key and a Call ID, associating the Call ID with the session key. The gatekeeper 70A may also recognize that for the requested communication that an existing session key and Call ID have already been established—for example, when a user is conferencing into an existing call. The session key may then be wrapped or encrypted with the public key of User A (for example, the public key extracted from the digital certificate) at process 580.

At process 590, the encrypted session key may be transmitted to the endpoint 40B, for example, in an admission confirmation (ACF) message sent in flow 440. The endpoint 40B, upon receipt of the encrypted session key may utilize a private key to decrypt the encrypted session key. In one embodiment, the resulting session key may then be kept on the authentication device 90 (e.g., smart cards 90A, 90B; USB tokens 90C, 90D) and utilized for communications—e.g., where the private key is kept on the authentication device 90. In other embodiments, the session key may be kept on the endpoint 40B. After obtaining the session key, a "setup" message may be transmitted back to the gatekeeper 70 at flow 445.

Upon receipt of the call setup message from the endpoint 40B, the gatekeeper 70 may in a process 600 transmit a setup message at flow 450 to the endpoint 60B that includes the Call ID. The gatekeeper 70A may also transmit a call proceeding message at flow 455 to let the endpoint 40B know that it is attempting to establish communications with the endpoint 60B. Upon receipt of the setup message in flow 450, the endpoint 60B may transmit a call proceeding message back to the gatekeeper 70, confirming that it has received the message.

As referenced above, for purposes of the brevity, details of authentication of User B with the endpoint 60B have not been shown. However, at this point, authentication of User B with the endpoint 60B may have already occurred. Accordingly, after receipt of a setup message in flow 450, the endpoint 60B may display some message, indicating that there is an incoming call. As an illustrative example, if the endpoint 60B is a phone, the phone may ring and display the identification of User A. User B may decide to answer call at flow 470.

The decision to answer the call from flow 470 may initiate processing similar to that described above. For example, the endpoint 60B may engage in a process 610 similar to process 520 of creating a digital signature to transmit in a admission request (ARQ) message to the gatekeeper 70A. For example, a clear token may be populated with items including, but not limited to, a date stamp, a timestamp, a random number to prevent playback, User B's digital certificate (which includes User B's public key), and the sender's ID field. Upon populating the clear token, the digital signature may initially be created using User B's private key and then hashed.

The digital certificate and digital signature may then be transmitted in a process 615 via an ARQ message to the gatekeeper 70A at flow 475. Upon receipt of the ARQ message (including the digital signature and digital certificate), the gatekeeper 70A may engage in a process 620 of verifying the integrity of the ARQ message (e.g., among other items by checking the hash value), a process of authenticating the digital certificate (e.g., utilizing a certificate authority's public key), a process 630 of extracting the public key from the digital certificate (e.g., utilizing a certificate authority's public key), a process 640 of authenticating the digital signature (e.g., utilizing the extracted public key), and a process 650 of assessing access privileges—all respectively similar to those describe above with reference to processes 530, 540, 550, and 560, among discussion of other processing.

If the specific message request is allowed, the gatekeeper 70A may utilizes the previously generated session key, recognizing this request is part of the previously requested call. The session key may be wrapped or encrypted with the public key of User B (for example, the public key extracted from the digital certificate) at process 660. At process 670, the encrypted session key may be transmitted to User B, e.g., in an admission confirmation (ACF) message sent in flow 480. The endpoint 60B, upon receipt of the encrypted session key may utilize a private key to decrypt the encrypted session key. As referenced above, in some embodiments, the resulting session key may be kept on the authentication device 90 (e.g., smart cards 90A, 90B; USB tokens 90C, 90D) and utilized for communications—e.g., where the private key is kept on the authentication device 90. In other embodiments, the session key may be kept on the endpoint 60B. After obtaining the session key, a "connect" message may be transmitted back to the gatekeeper 70A at flow 485. Upon receipt of the connect message in flow 485, the gatekeeper 70A may transmit a connect message to the endpoint 40B at flow 490.

At the bottom of FIG. 5 are illustrations of communication between points in call flow 400. A clear voice communication link 1010, 1040 may be present between User A and endpoint 40B, and User B and endpoint 60B, respectively. A session key encrypted communication link 1020, 1030 may be present between the endpoint 40B and the gatekeeper 70A, and the endpoint 60B and the gatekeeper 70A. Thus, the gatekeeper serves as a multi-threaded intermediary between the endpoints.

Figure 6:
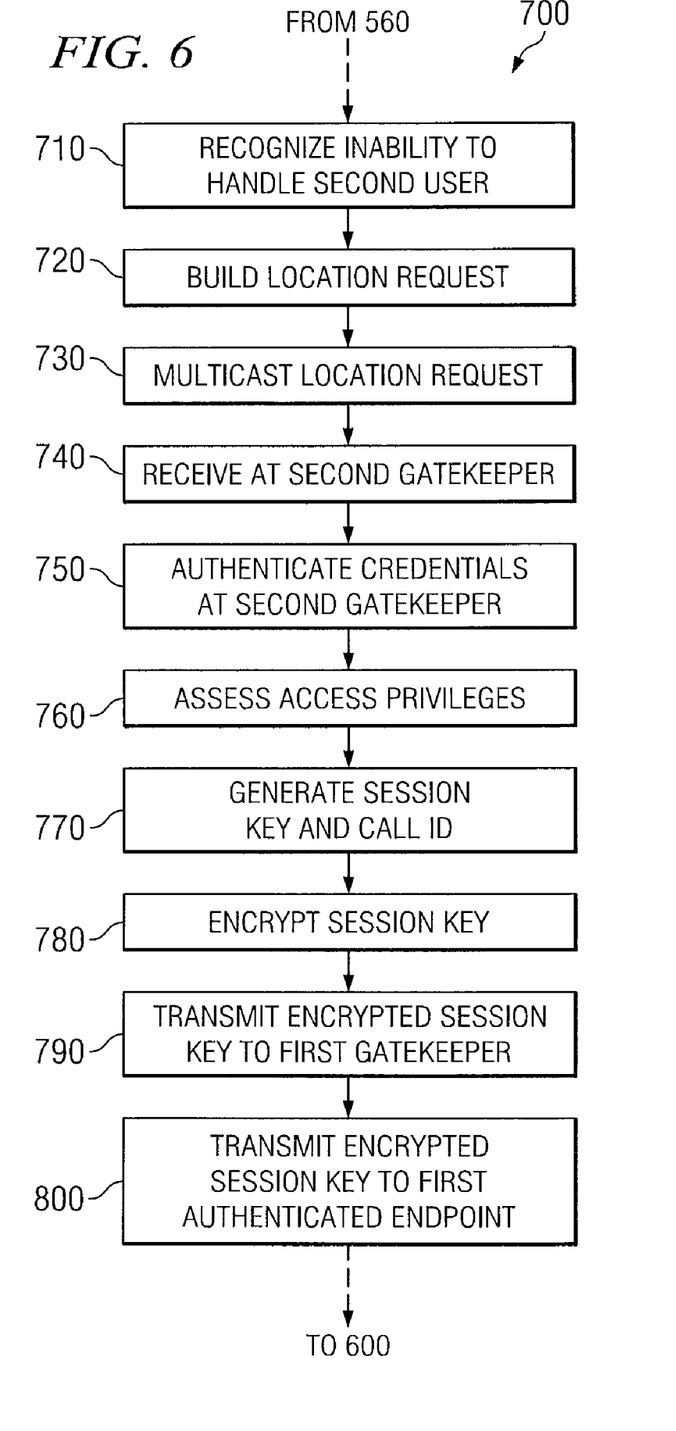
FIG. 6 is a process flow diagram, modifying the process of FIG. 4 according to an embodiment of the invention.
Figure 7:
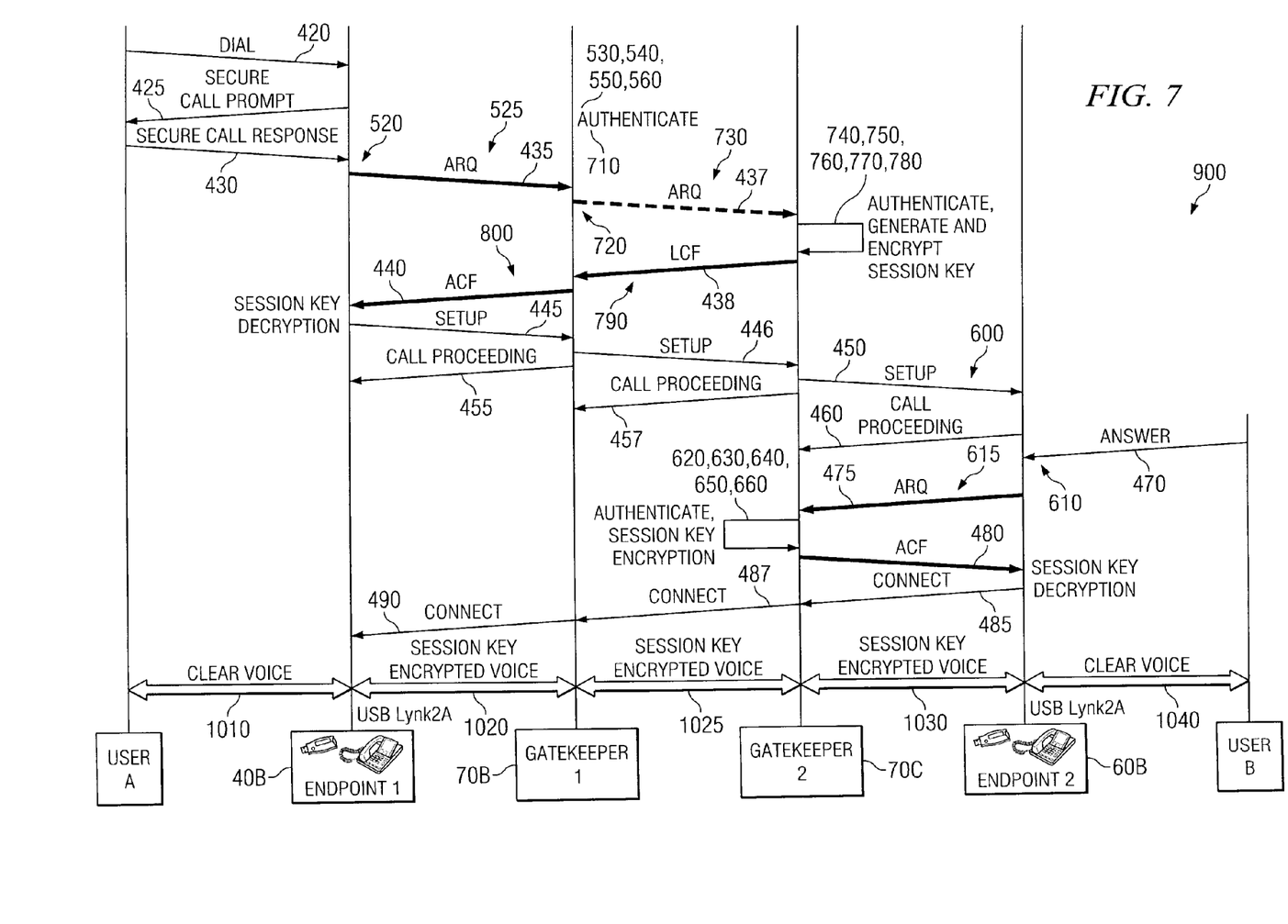
FIG. 7 is a call flow diagram of an embodiment that may be utilized to establish communication between a first endpoint and a second endpoint, utilizing two gatekeepers.

FIG. 6 is a process flow diagram, modifying the process 500 of FIG. 4 according to an embodiment of the invention. FIG. 7 is an embodiment of an establishment of communications between a first endpoint and second endpoint, utilizing two gatekeepers. A flow 900 of FIG. 7 modifies a flow 400 of FIG. 5. With reference to FIGS. 3, 6, and 7, the following is an example illustration of establishment of communications between an endpoint 40B and an endpoint 60B through gatekeepers 70B, 70C and utilizing process 700 and flow 900. The embodiment of FIG. 7 operates in a similar manner to the embodiment of FIG. 6. Accordingly, only differences will be described.

A process 700 may proceed through the various processes of process 500 up through process 560, assessing the access privileges of the endpoint 70B. From process 560, a process 710 at gatekeeper 70B may recognize an inability to handle the call request—e.g., User B may not be a user supported by gatekeeper 70B. Accordingly, the gatekeeper 70B may build a location request (LRQ) at process 720. The LRQ, among other items, may includes credentials for both the gatekeeper 70B and User A. Example credentials for the User A may be the same items transmitted in the ARQ at flow 435 (e.g., digital certificate and digital certificate). Example credentials for the gatekeeper 70B may include a digital certificate and/or digital signature for the gatekeeper 70B. The location request (LRQ) may then be multicast to all known gatekeepers at process 730, corresponding to flow 437.

A gatekeeper 70C, capable of processing User B may receive the LRQ at process 740. The gatekeeper 70, upon receiving the LRQ may initiate a process 750 of authentication of not only the gatekeeper 70B, but also the endpoint 40B. In other embodiments, the gatekeeper 70C may only authenticate credentials of the gatekeeper 70B. Among other items, the authentication may generally include verifying the digital certificate with a public key of a trusted certificate authority, extracting public keys from the digital certificate (e.g., using the public key of the certificate authority), and authenticating or decrypting the digital signature with the extracted public keys. A variety of other techniques or processes may be utilized to authenticate credentials across gatekeepers (e.g., across domains). For example, an enterprise validation authority may populate multiple route certificates, multiple trust chains, and multiple certificate revocation lists from each certificate authorities.

After authentication at process 750, the gatekeeper 70C may proceed by assessing access privileges at process 760. This may be done in lieu of or in addition to process 560's assessment of access privileges. The process 760 may operate in a similar manner to process 560. If the specific message request is allowed, the gatekeeper 70C in a process 770, similar to process 570, may generate a session key and a Call ID, associating the Call ID with the session key. The gatekeeper 70C may also recognize that for the requested communication that a session key and Call ID may have already been established—for example, when a user is conferencing into an existing call. The session key may be encrypted at process 780 in a variety of different manners. For example, in some embodiments, it may generally be desirable for not only the endpoint 40B to have the session key, but also for the gatekeeper 70B to have the session key. Accordingly, in some embodiments, the session key may be encrypted with a public key of the gatekeeper 70B (e.g., extracted from the gatekeeper's digital certificate). In this embodiment, the gatekeeper 70B, upon receipt of the encrypted session, may decrypt the session key utilizing the private key of the gatekeeper 70B. Then, the session key may be re-encrypted with the public key of the endpoint 40B and transmitted to the endpoint 40B. In other embodiments the encryption process 780 may include two encryption packages—one session key encrypted with the public key of gatekeeper 70B and one session key encrypted with the public key of the endpoint 40B. Yet other variations may be utilized.

At a process 790, the encrypted session key may be transmitted to the gatekeeper 70B, for example, in a location confirm (LCF) message sent at flow 438. Upon receipt of the LCF message in flow 910, the gatekeeper 70B may initiate its own authentication of the gatekeeper 70C. As referenced above, some embodiments may have the session key present at the gatekeeper 70B in addition to already being present at gatekeeper 70C. In embodiments where the session key is present at the gatekeeper 70B, a user may be able to conference in to the call by obtaining the session key from either the gatekeeper 70B or gatekeeper 70C.

A process 800 may generally include transmitting a session key, encrypted with the public key of endpoint 40B. In a manner similar to that described above, the endpoint 40B, upon receipt of the encrypted session key may utilize a private key to decrypt the encrypted session key. In one embodiment, the resulting session key may be kept on the authentication device 90 (e.g., smart cards 90A, 90B; USB tokens 90C, 90D) and utilized for communications—e.g., where the private key is kept on the authentication device 90. In other embodiments, the session key may be kept on the endpoint 40B. After obtaining the session key, a "setup" message may be transmitted back to the gatekeeper 70B at flow 445 in a similar manner described above with reference to FIG. 5. The remaining process 700 and flow 900 proceed in a similar manner to process 500 and flow 400 respectively, establishing a connection with User B. Additional call flows include a relay of message between gatekeepers 70B and 70C, namely a relay of a setup message at flow 446, a relay of a call proceeding message at flow 457, and a relay of a connect message at flow 487.

At the bottom of FIG. 7 are illustrations of communication between points in call flow 900. A clear voice communication link 1010, 1040 may be present between User A and endpoint 40B, and User B and endpoint 60B, respectively. A session key encrypted communication link 1020, 1030 may be present between the endpoint 40B and the gatekeeper 70B, and the endpoint 60B and the gatekeeper 70C. Additionally a session key encrypted communication link 1025 may be present between gatekeeper 70B and gatekeeper 70C.

With reference to embodiments in FIGS. 1-7, the gatekeeper may be seen as a multi-threaded intermediary between the endpoints. Utilizing a system 100 in embodiments above, a multipoint control unit (MCU) stored on a server (e.g., server 80A or 82A) in a voice conference environment may be allowed to only focus on encrypting and decrypting communications transmitted between endpoints. Thus, for example, encrypted communications may come into the server (e.g., server 80A and 82A) from a plurality of endpoints and be decrypted by the MCU. After decryption, the MCU may hand off the decrypted communications to a hardware muxer to combine the communications. The combined unencrypted communications are then sent back to the MCU to be encrypted and sent back to each respective endpoint.

With reference to embodiments described and concepts of authentication and access control disclosed herein, multi-level security (MLS) may be achieved via a tie-in to a trusted source.

With reference to some of the embodiments described above, a single session key has been described for utilization in a call. In other embodiments, multiple session keys may be utilized—one or more for each endpoint. In such embodiments, the gatekeeper may generate multiple session keys, associating each of the multiple session keys with the Call ID.

Similar to some of the embodiments described above, each session key may be encrypted with each respective endpoint's public key. When a new endpoint is authenticated and seeks conferencing into an existing call, the gatekeeper may generate a new session key, associate the new session key with the Call ID, encrypt the new session key with the new endpoint's public, and transmit the new encrypted session key to the new endpoint, thereby allowing the new endpoint to conference into the existing call.

Although reference has generally been made in several of the embodiments described above to a voice call being established two or more endpoints, it should be expressly understood that other types of calls may include, but are not limited to, media and/or other data calls.

In operations of embodiments of the system 100, described above with reference to FIGS. 1-7, the processes and flows may be performed using any suitable logic comprising software, hardware, other logic, or any suitable combination of the preceding. Additionally, with the embodiments described above, any of variety of encryption algorithms and protocols may be utilized, including in some embodiments, High-Assurance Internet Protocol Encryption (HAIPE), Advanced Encryption Standard (AES), and elliptic curve cryptography (ECC). Although an H.323 standard has been described above, other protocols and standards may utilized with teaching of the invention including, among others, session initiated protocol (SIP). A variety of other algorithms and protocols may be utilized.

Numerous other changes, substitutions, variations, alterations, and modifications may be ascertained to one skilled in the art and it is intended that the present invention encompass all such changes, substitutions, variations, alterations, and modifications as falling within the scope of the appended claims.

What is claimed is:

1. A method of securing a call, the method comprising:
using a computerized system, determining whether a first endpoint or a first authentication device associated with a first user supports session key functionality;
receiving, at a first gatekeeper from the first endpoint, a Voice-over Internet Protocol ("VoIP") call request, the VoIP call request comprising a first digital certificate containing a first public key;
using a computerized system, authenticating the first digital certificate;
if authentication succeeds, using a computerized system, obtaining the first public key from the digital certificate;
using a computerized system, assessing access privileges of the first user's right to participate in the call;
if the first user has sufficient access privileges to participate in the call, using a computerized system, generating a session key at the first gatekeeper;
using a computerized system, encrypting the session key with the first public key to yield a first encrypted session key;
using a computerized system, determining whether the first gatekeeper can process the call request by determining whether the first gatekeeper supports communication with a second user associated with a second endpoint;
if the first gatekeeper does not support communication with the second user associated with the second endpoint, using a computerized system:
multicasting a location request to one or more known gatekeepers, the one or more gatekeeper comprising a second gatekeeper, the second gatekeeper supporting communication with the second user associated with the second endpoint,
receiving a third encrypted session key from the second gatekeeper, the second gatekeeper encrypting a second session key with a public key associated with the first gatekeeper to yield the third encrypted session key,
decrypting the third encrypted session key at the first gatekeeper, and
encrypting the second session key at the first gatekeeper with a second public key to yield a second encrypted session key
if the first gatekeeper does support communication with the second user associated with the second endpoint, using a computerized system, encrypting the session key with the second public key to yield a second encrypted session key;
using a computerized system, transmitting the first encrypted session key from the first gatekeeper to a first endpoint; and
using a computerized system, transmitting the second encrypted session key from the first gatekeeper to a second endpoint, wherein
the first gatekeeper is at a location other than a location of the first endpoint and the second endpoint, and
the session key is operable to encrypt a VoIP call between the first endpoint and the second endpoint.

2. The method of claim 1, further comprising:
authenticating the first user with the first endpoint.

3. The method of claim 2, wherein the authentication of the first user with the first endpoint includes at least two different types of authentication.

4. The method of claim 3, wherein at least one of the at least two different types of authentication includes a biometric authentication.

5. The method of claim 4, wherein
the authentication of the first user with the first endpoint includes at least three different types of authentication,
at least one of the at least three different types of authentication is a hardware token, and
at least one of the at least three different types of authentication is a password.

6. The method of claim 1, further comprising:
receiving the first encrypted session key at the first endpoint;
decrypting the first encrypted session with a private key on the first endpoint to yield the session key; and
storing the session key on a token.

7. The method of claim 5, wherein the hardware token is a USB token.

8. The method of claim 1, further comprising:
assessing privileges of a user associated with the first endpoint.

9. A system, comprising:
one or more computer readable storage mediums; and
logic encoded on the one or more computer readable storage mediums, the logic when executed operable to:
determine whether a first endpoint or a first authentication device associated with a first user supports session key functionality;
receive, at a first gatekeeper from the first endpoint, a Voice-over Internet Protocol ("VoIP") call request, the VoIP call request comprising a first digital certificate containing a first public key;
authenticate the first digital certificate;
if authentication succeeds, obtain the first public key from the digital certificate;
using a computerized system, assessing access privileges of the first user's right to participate in the call;

if the first user has sufficient access privileges to participate in the call, generate a session key at the first gatekeeper;
encrypt the session key with the first public key to yield a first encrypted session key;
determine whether the first gatekeeper can process the call request by determining whether the first gatekeeper supports communication with a second user associated with a second endpoint;
if the first gatekeeper does not support communication with the second user associated with the second endpoint:
  multicast a location request to one or more known gatekeepers, the one or more gatekeepers comprising a second gatekeeper, the second gatekeeper supporting communication with the second user associated with the second endpoint,
  receive a third encrypted session key from the second gatekeeper, the second gatekeeper encrypting a second session key with a public key associated with the first gatekeeper to yield the third encrypted session key,
  decrypt the third encrypted session key at the first gatekeeper, and
  encrypt the second session key at the first gatekeeper with a second public key to yield a second encrypted session key
if the first gatekeeper does support communication with the second user associated with the second endpoint,
  encrypt the session key with the second public key to yield a second encrypted session key;
transmit the first encrypted session key encrypted with the first public key from the first gatekeeper to a first endpoint; and
transmit the second encrypted session key encrypted with the second public key from the first gatekeeper to a second endpoint, wherein
  the first gatekeeper is at a location other than a location of the first endpoint and the second endpoint, and
  the session key is operable to encrypt a VoIP call between the first endpoint and the second endpoint.

10. The system of claim 9, wherein the software is further operable to:
authenticate the first user with the first endpoint.

11. The system of claim 9, wherein the software is further operable to:
authenticate a user with the first endpoint, utilizing at least two different types of authentication, wherein at least one of the at least two different types of authentication includes a biometric authentication.

12. The system method of claim 11, wherein
the logic in authentication uses at least three different types of authentication,
at least one of the at least three different types of authentication is a hardware token, and
at least one of the at least three different types of authentication is a password.

* * * * *